(12) United States Patent
Marocco (10) Patent No.: US 7,107,889 B2
(45) Date of Patent: Sep. 19, 2006

(54) SINGLE PLATE CUT DOWN APPARATUS

(75) Inventor: Norbert Marocco, Woodbridge (CA)

(73) Assignee: Shad-O-Matic Limited, Toronto (CA)

( * ) Notice: Subject to any disclaimer, the term of this patent is extended or adjusted under 35 U.S.C. 154(b) by 782 days.

(21) Appl. No.: 09/814,261

(22) Filed: Mar. 21, 2001

(65) Prior Publication Data

US 2001/0017073 A1    Aug. 30, 2001

Related U.S. Application Data

(63) Continuation-in-part of application No. 09/340,574, filed on Jun. 28, 1999, now abandoned.

(51) Int. Cl.
*B26D 1/00* (2006.01)
*B26D 5/08* (2006.01)

(52) U.S. Cl. .............................. 83/198; 83/200; 83/549; 83/563; 29/24.5

(58) Field of Classification Search .................. 83/200, 83/563, 549, 198; 29/24.5
See application file for complete search history.

(56) References Cited

U.S. PATENT DOCUMENTS

| | | | | | |
|---|---|---|---|---|---|
| 1,309,848 | A | * | 7/1919 | Gabriel | 83/198 |
| 3,362,272 | A | * | 1/1968 | Grosse | 83/198 |
| 3,451,297 | A | * | 6/1969 | Reis et al. | 83/198 |
| 3,854,358 | A | * | 12/1974 | Kruse | 83/198 |
| 5,806,394 | A | * | 9/1998 | Marocco | 29/24.5 |
| 5,816,126 | A | * | 10/1998 | Pluber | 29/24.5 |
| 6,079,306 | A | * | 6/2000 | Liu | 83/454 |
| 6,089,134 | A | * | 7/2000 | Marocco | 83/454 |
| 6,167,789 | B1 | * | 1/2001 | Daniels et al. | 29/24.5 |
| 6,178,857 | B1 | * | 1/2001 | Marocco | 29/24.5 |
| 6,196,099 | B1 | * | 3/2001 | Marocco | 29/24.5 |
| 6,240,824 | B1 | * | 6/2001 | Hsu | 29/24.5 |
| 6,314,851 | B1 | * | 11/2001 | Graves et al. | 29/24.5 |
| 6,334,379 | B1 | * | 1/2002 | Sudano | 29/24.5 |
| 6,336,388 | B1 | * | 1/2002 | Marocco | 83/454 |
| 6,688,204 | B1 | * | 2/2004 | Huang | 29/24.5 |
| 6,758,120 | B1 | * | 7/2004 | Marocco | 29/24.5 |
| 6,761,099 | B1 | * | 7/2004 | Lin et al. | 29/24.5 |
| 2004/0025652 | A1 | * | 2/2004 | Marocco | 83/13 |
| 2005/0166740 | A1 | * | 8/2005 | Marocco | 83/679 |

OTHER PUBLICATIONS

Documents from case of: *Springs Window Fashions LP and Shade-O-Matic Ltd. VS Novo Industries, L.P.*, Memorandum and Order 01-C-400-S, vol. 1 and 2.

* cited by examiner

*Primary Examiner*—Timothy V. Eley
*Assistant Examiner*—Jason Prone
(74) *Attorney, Agent, or Firm*—Ohlandt, Greeley, Ruggiero & Perle, L.L.P.

(57) ABSTRACT

A vertical blind cut down apparatus has a head rail holding plate with a head rail opening for receiving the head rail. The vertical blind cut down apparatus also has a cutting die to receive the head rail. The cutting die is movable relative to the holding plate for cutting one end of the head rail. The vertical blind cut down apparatus further has a blind holder with a blind material opening. The blind holder receives the blind materials. A blind cutting device is movable relative to the blind holder and cuts the blind material extending through the blind holder. The vertical blind cut down apparatus also has a first movement transmission for moving the head rail cutting die and a second movement transmission for moving the blind cutting device whereby both the blind materials and the head rail are cut.

2 Claims, 6 Drawing Sheets

SINGLE PLATE CUT DOWN APPARATUS

This application is a Continuation-in-Part of application Ser. No. 09/340,574 Filed Jun. 28, 1999 now abandoned.

BACKGROUND OF THE INVENTION

1. Field of the Invention

The invention relates to a machine for trimming the ends of components of vertical blinds having a horizontal head rail and vertical strips or louvers.

2. Description of the Prior Art

In the past various apparatus has been designed for cutting down widths of specific designs, usually horizontal Venetian blinds. However, in general terms, these machines have not been totally suitable for cutting down both horizontal and vertical blinds, especially those being made from a variety of different materials. In addition, they have been somewhat more complex and costly than is required. In vertical blinds, the trolleys and the blind slats may be drawn along the head rail to one side or other of the window opening, or in some cases to both sides, and may be rotated between open and closed position, by a mechanism located in the head rail. These slats may be of aluminium, or may be formed of other materials such as thermo plastic, or of fabric.

Such blinds must be fitted to the width and to the height, of the window or other opening for which they are intended. In the past such vertical blinds have been made in a factory, on a custom basis to a particular width and height specified by the purchaser. A salesperson would usually have had to call on the customer to take measurements and take an order. However, it is more convenient to manufacture blinds in certain standard widths and heights and stock these standard blinds in a retail store. A customer may then simply come into the store and buy a blind slightly wider and higher than the desired width and height, and have it trimmed. The head rail is cut to the desired width and in the case of vertical blinds the vertical slats are cut at their lower ends to the desired height. This is both more economical, and thus more readily saleable, and at the same time provides the customer with an opportunity to purchase blinds in a retail establishment and walk out of the store with them in his possession, rather than meeting a salesperson at home, and waiting a few weeks for them to be fabricated in a factory.

As mentioned above, in the past various apparatus has been designed for cutting down widths of horizontal Venetian blinds. However, in general terms, these machines have not been totally suitable for cutting down vertical blinds, especially those made of a variety of different materials. In addition they have been somewhat more complex and costly than is required. In vertical blinds, the trolleys and the blind slats may be drawn along the head rail to one side or the other of the window opening, or in some cases to both sides, and may be rotated between open and closed positions, by a mechanism located in the head rail.

Advantageously, these vertical blinds too would be provided in standard widths and heights, in a retail store and it would be desirable to provide an apparatus in the store for cutting down the width of the head rail and the height of the slats.

Preferably, in order to economize in-store installations of cut-down equipment and also to simplify instruction of staff, a single cut-down machine will be provided which enables both the head rails and the blind slats of vertical blinds to be cut down to the desired width and height.

One of the considerations in designing such a cut-down machine is the manual effort that is required to operate the machine to cut through the various different materials.

Clearly, metal such as steel used in the horizontal head rails, is relatively hard to cut. On the other hand, since the sections used in this type of product are relatively thin, the die for cutting the steel components of the blind may only be required to move a short distance.

Consequently, so long as adequate leverage is provided to move the metal cutting die a relatively short distance, this problem can be addressed.

On the other hand, the cutting of the vertical blind slats themselves presents entirely different problems. The slats are usually made of relatively soft material that is easy to cut, and requires less manual effort. On the other hand, the thickness of all of the blind slats when bundled together for cutting is considerable. Consequently, the means for cutting the blind slats must move a considerable distance.

While it is relatively easy to provide for the manual operation of such a cutting means moving a considerable distance for cutting bundles of blind slats, the problem becomes more complex when it is understood that it is desirable to cut all of the components in a single machine.

It is not desirable to provide two machines one that cuts only the head rail, usually made of steel, and a second machine for an entirely separate cut for cutting the blind slats. The cost of two machines may not be justified. Personnel must be trained on two machines.

The moving of the blind from one machine would be cumbersome and undesirable and the end result would not be satisfactory.

For these reasons therefore the design of a vertical blind cut down machine meeting all of these objectives, i.e. being capable of cutting through both the thicker bundle of blind slats, and the thinner harder head rail in a single manual cutting machine presents a complex problem.

When trimming the blind it is necessary to provide for cutting the complete bundle of blind slat or along their lower ends, by cutting all the slat ends along a common plane.

It is also desirable to provide end stops for controlling the length of cut both from the blind slats and from the head rail, respectively. The lengths will usually be different from one another, in the case of a vertical blind, so that the end stops should be settable to two different lengths, while enabling the machine to cut both the blind slats and the head rail in a single manual operation.

It is also desirable to provide a form of ends stop which is both adjustable to adjust the length of trim cut being cut off the blind components, and which is also moveable during the cutting stroke. This last requirement moves the end stops away from contact with the components, so that as they are cut the trim portions are free to fall away without obstruction from the end stops.

SUMMARY OF THE INVENTION

With a view to providing a vertical blind cut down apparatus which addresses the various foregoing conflicting problems, the invention comprises a vertical blind cut-down apparatus for cutting a shade or a blind with the blind being of the type having at least a head rail component, and vertical window coverings suspended from the head rail. The apparatus has a blind component holding plate having at least a head rail opening and a blind slat opening formed therein for receiving respective components of a blind therethrough. The apparatus holds them in position for cutting and has a blind slat cutting bar. The blind slat cutting bar is moveable relative to the holding plate. The apparatus further has a carrying blind slat cutting device for cutting blind slat material that extends through the holding plate, and a head rail cutting die support. The head rail cutting die support is adjacent to the cutting bar. The cutting die support carries at least one cutting die for receiving the head rail extending therethrough. The cutting bar is moveable relative to the holding plate for cutting the blind slat components. The apparatus further has movement means for moving the blind cutting bar and the cutting die support, whereby both said blind slat material and the head rail may be cut in a common plane along the surface of the holding plate.

The invention further provides such an apparatus in which the head rail opening defines a transverse axis and in which the head rail opening in the holding plate is tilted at an angle. The cutting die defines a cutting opening, which is similarly diagonal with the cutting die and is slidably movable relative to the holding plate so that the headrail is cut along a linear diagonal direction.

The invention further provides such a cut down apparatus in which the blind cutter bar for the blind cutting means is slidable along a linear path relative to the holder plate, and in the same plane as said cutting die support, said cutter bar being spaced from said cutting die support by a distance at least equal to the cutting path of said cutting means.

The invention further provides such an apparatus in which the movement means comprises a rotary shaft mounted in said holder plate, and a cam mounted on said rotary shaft for moving said cutting die support a sufficient distance to sever the head rail, and including movement transmission means connecting between said rotary shaft and said cutter bar, for moving said cutter bar simultaneously with said cutting die support.

The invention further provides end stop apparatus for defining the length of the blind slats to be cut off, and also for defining the length of the head rail to be cut off, and having adjustment devices for setting two lengths different from one another.

The invention further provides end stops positioned to register with the various blind components being trimmed, and which end stops are adjustable to fix the trim length of each component separately, and which end stops are also moveable, during the cutting stroke, so that they move away from the trim portions of the components, as they are being cut so that they are free to fall away and do not remain held in position.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DETAILED DESCRIPTION OF THE INVENTION

Figure 1:
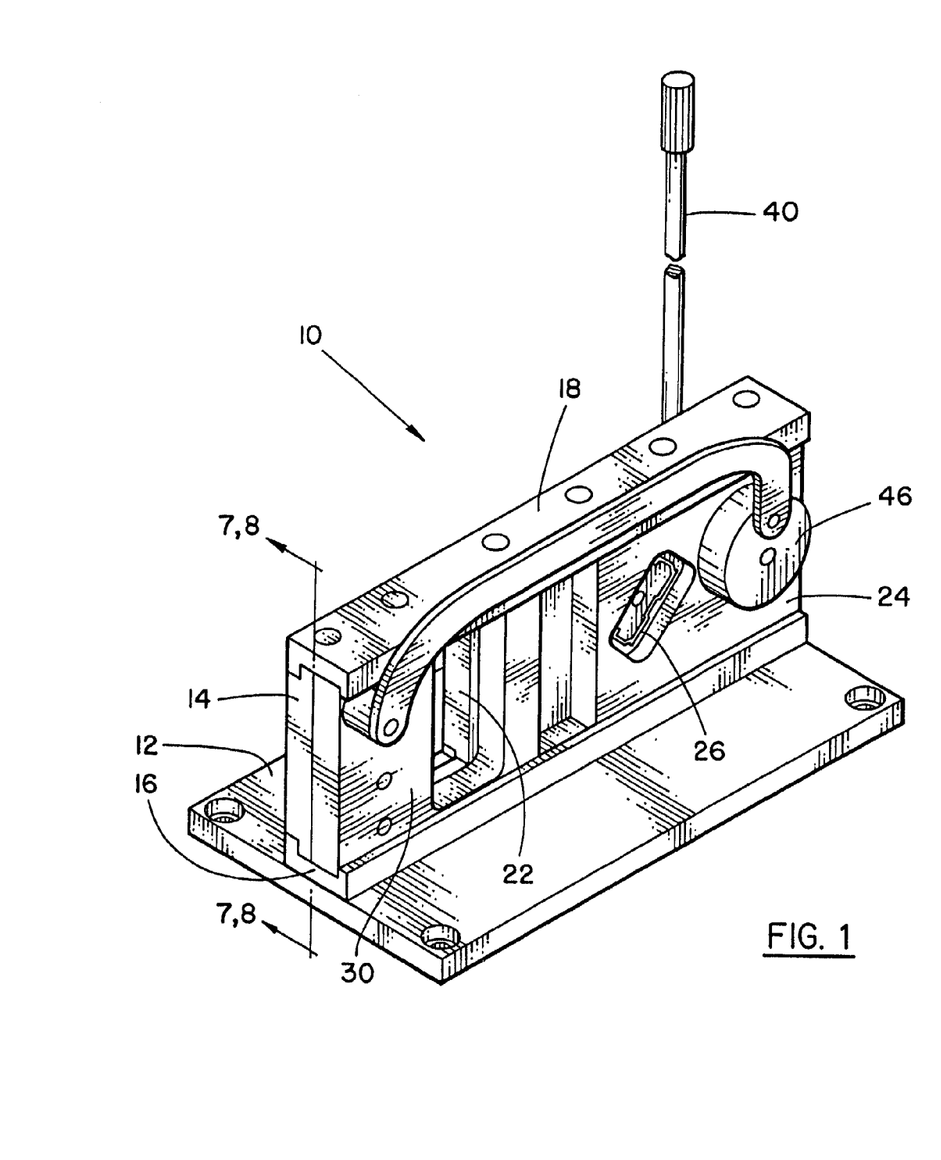
FIG. 1 is a perspective of a vertical blind cut down apparatus illustrating the present invention.
Figure 2:
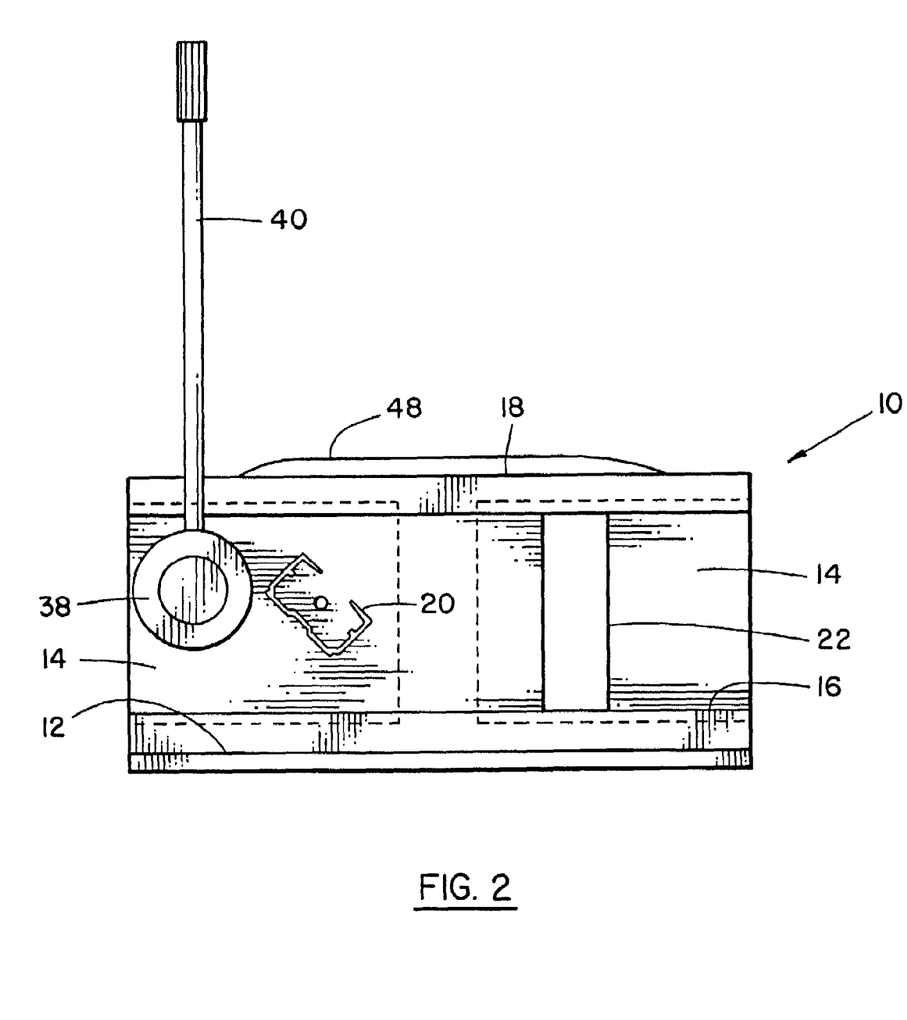
FIG. 2 is a side elevation of the apparatus from the fixed holder plate side.

Referring to FIG. 1, the present invention is illustrated as an embodiment of an in-line cut down apparatus for trimming vertical blinds, indicated generally as 10. The apparatus 10 has a base plate 12 and a fixed component holder plate 14. The component holder plate 14 is secured to a lower channel 16, which is mounted on plate 12, and an upper channel 18 that is secured to the top edge of plate 14.

The holder plate 14 is provided with a head rail holder opening 20, and a blind covering component holder opening 22, (in this case blind slats).

The head rail opening 20 will clearly have to necessarily conform to the shape of the head rail of the particular blind being cut down. However, since the apparatus will normally be provided to the retail outlet by the manufacturer of the blinds, this presents no problem.

In some cases, it is conceivable that interchangeable dies could be provided, but it is believed to be an unnecessary and expensive refinement.

A moveable head rail cutting die support plate 24 is slidably mounted between the lower channel 16 and the upper channel 18. The moveable head rail cutting plate 24 has a head rail cutting die defining an opening 26, which has a shape corresponding to the head rail holder opening 20 in fixed plate 14. Movement of the plate 24 will therefore cause movement of the die opening 26 and thereby sever the head rail.

A blind cutting bar 30 is slidably mounted between lower channel 16 and upper channel 18. It is provided with a blind cutting opening 32, which is preferably provided with some form of blind material cutter such as knives 34 which are located so as to sweep past the opening 22 in holder plate 14 and thereby cut blind material extending therethrough.

Figure 3:
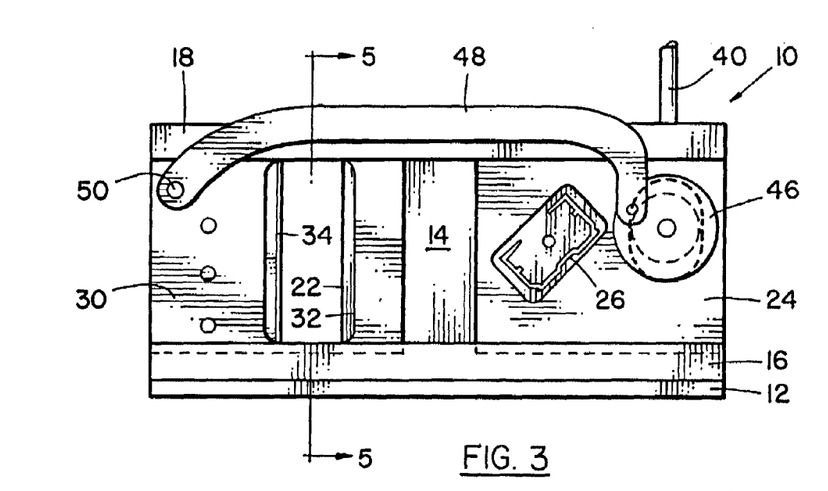
FIG. 3 is a side elevation of the apparatus from the moveable die and cutter side.

As best shown in FIG. 3, there is a space between head rail die support 24 and blind cutter bar 30, for reasons to be described below, so as to permit the two members to travel simultaneously, and co-axially but along movement paths which are of different lengths from one another.

Figure 6:
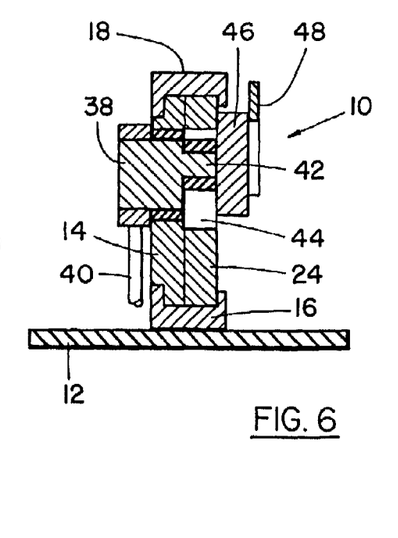
FIG. 6 is a section along the line 6—6 of FIG. 4.
Figure 7:
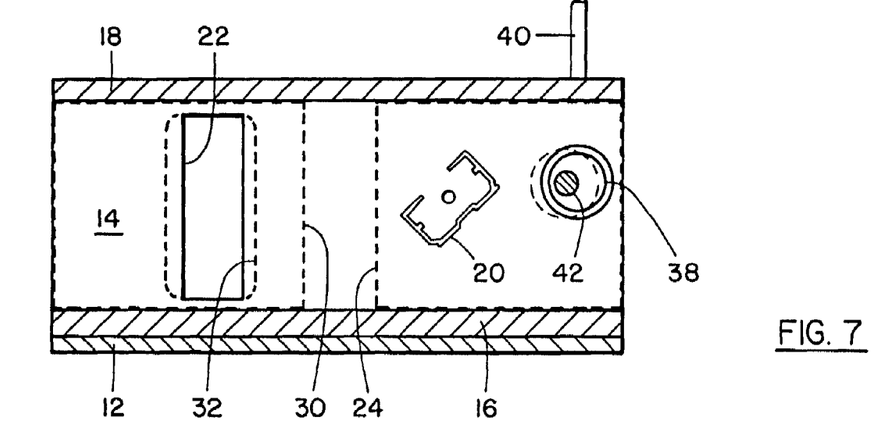
FIG. 7 is a section along line 7—7 of FIG. 1, showing a first position.
Figure 8:
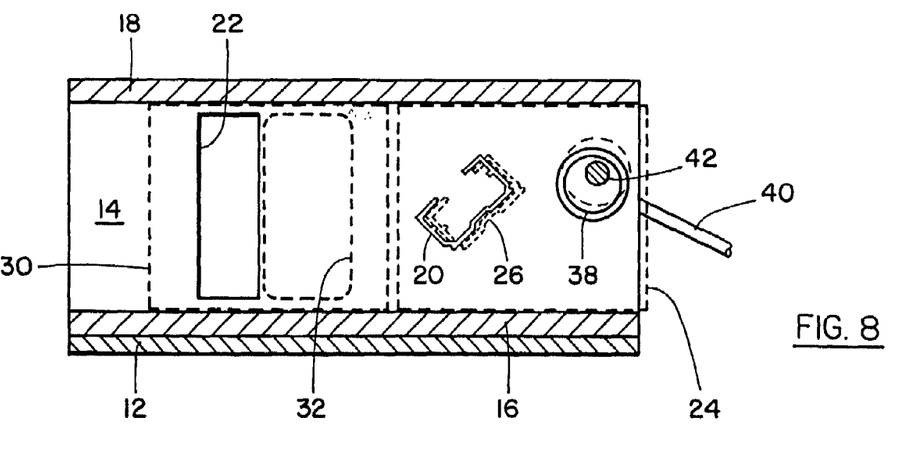
FIG. 8 is a section along line 8—8 of FIG. 1, showing a second position.

In order to move both members simultaneously, there is provided a drive shaft 38, which is rotatably mounted in suitable bearings in fixed holder plate 14 (FIG. 6). Coupled to the drive shaft 38 is a manually operable lever 40.

Drive shaft 38 terminates within the thickness of moveable plate 24, in an off-set drive cam 42. Drive cam 42 is moveable around an orbit. A drive opening 44 is provided in plate 24 to receive cam 42.

It will thus be seen that by the operation of lever 40, the drive shaft 38 can be rotated. Rotation of the drive shaft 38 will procure orbital movement of the cam 42 within recess 44. The cam 42 is offset from the central axis of the drive shaft 38, by a relatively small radial distance, and therefore drive cam 42 will cause sliding movement of plate 24 along a relatively short distance (compare FIGS. 3 and 4).

A boss 46 is mounted on the end of orbital drive cam 42. Drive cam 42, will cause boss 46 to orbit around the axis of shaft 38. The boss 46 is connected to a crank arm 48, which is in turn pinned by pin 50 to cutter bar 30.

Thus as the drive cam 42 orbits around a relatively small arc relative to the central axis of drive shaft 38, the outer periphery of boss 46 will orbit around a much greater distance. This greater distance will be coupled through crank arm 48, to cutter bar 30, which will thus move simultaneously with movement of die support 24 but over a distance which is substantially greater (compare FIGS. 3 and 4 and 5 and 6).

Reference may be made to the arrow A1, A2 (FIG. 4) for a comparison of the two different distances moved by the two separate members.

It will thus be seen that the invention provides a relatively simple straightforward blind cut down apparatus, which is adapted to cut down the head rail and the blind material of a vertical blind in a single machine. The blind head rail cutting action is achieved over a relatively small distance using considerable leverage. The head rail typically will be of relatively thin metal, or in some cases of only slightly thicker extruded plastic material. Thus, a relatively short movement of the cutting die will sever the head rail. The blind material cutting means moves a substantially greater distance, simultaneously with movement of the head rail cutting support. This movement along the blind slat cutting path will continue after the head rail has been cut, in most cases, depending upon the number, and thickness, of the blind slats being cut. Thus, the manual effort required for cutting the head rail will be completed relatively early in the cutting stroke of the lever, whereas the manual effort of cutting the blind slats will be extended over a greater length of movement of the lever.

Figure 9:
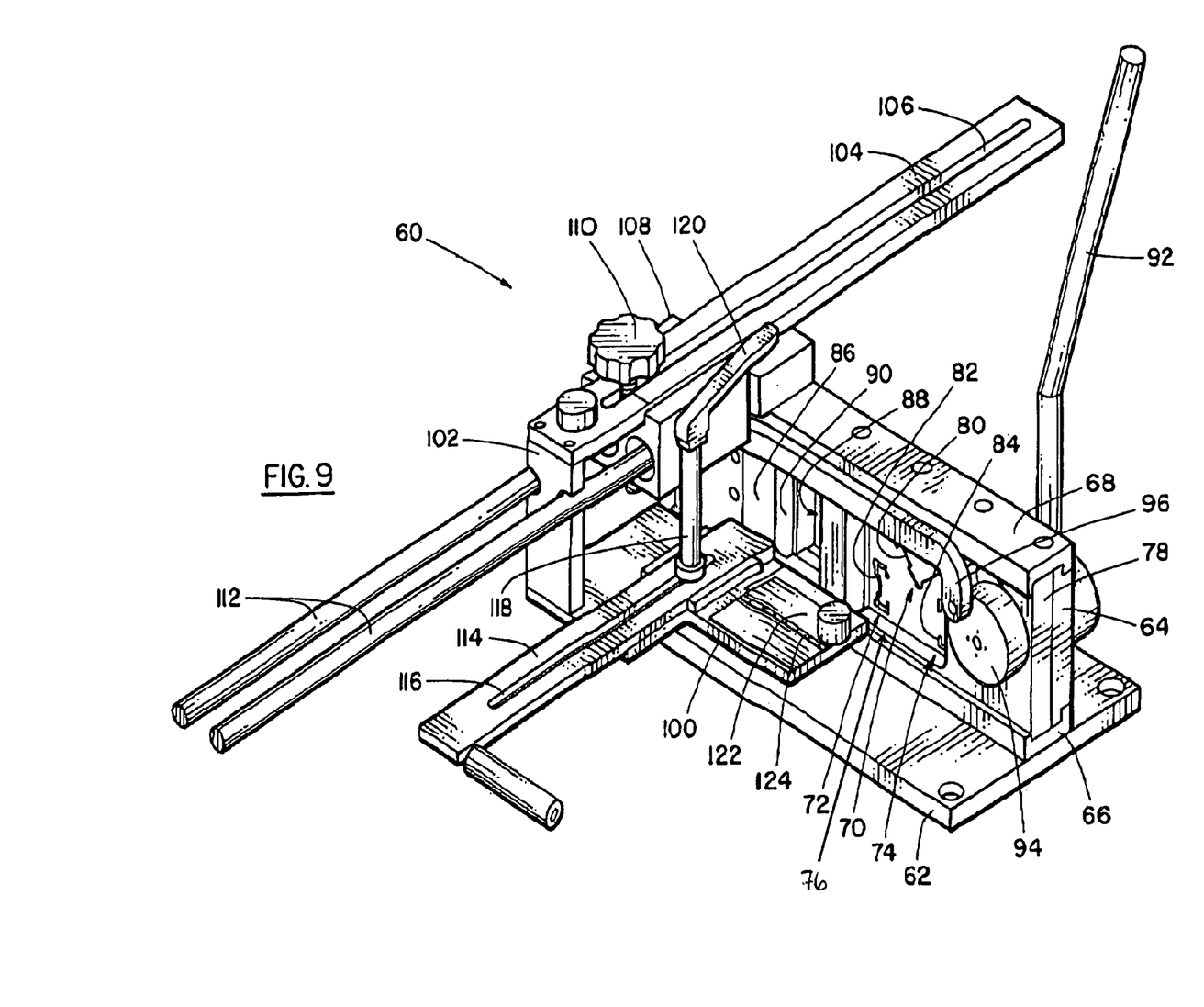
FIG. 9 is a perspective illustration of a further embodiment of the vertical blind cut down apparatus.
Figure 10:
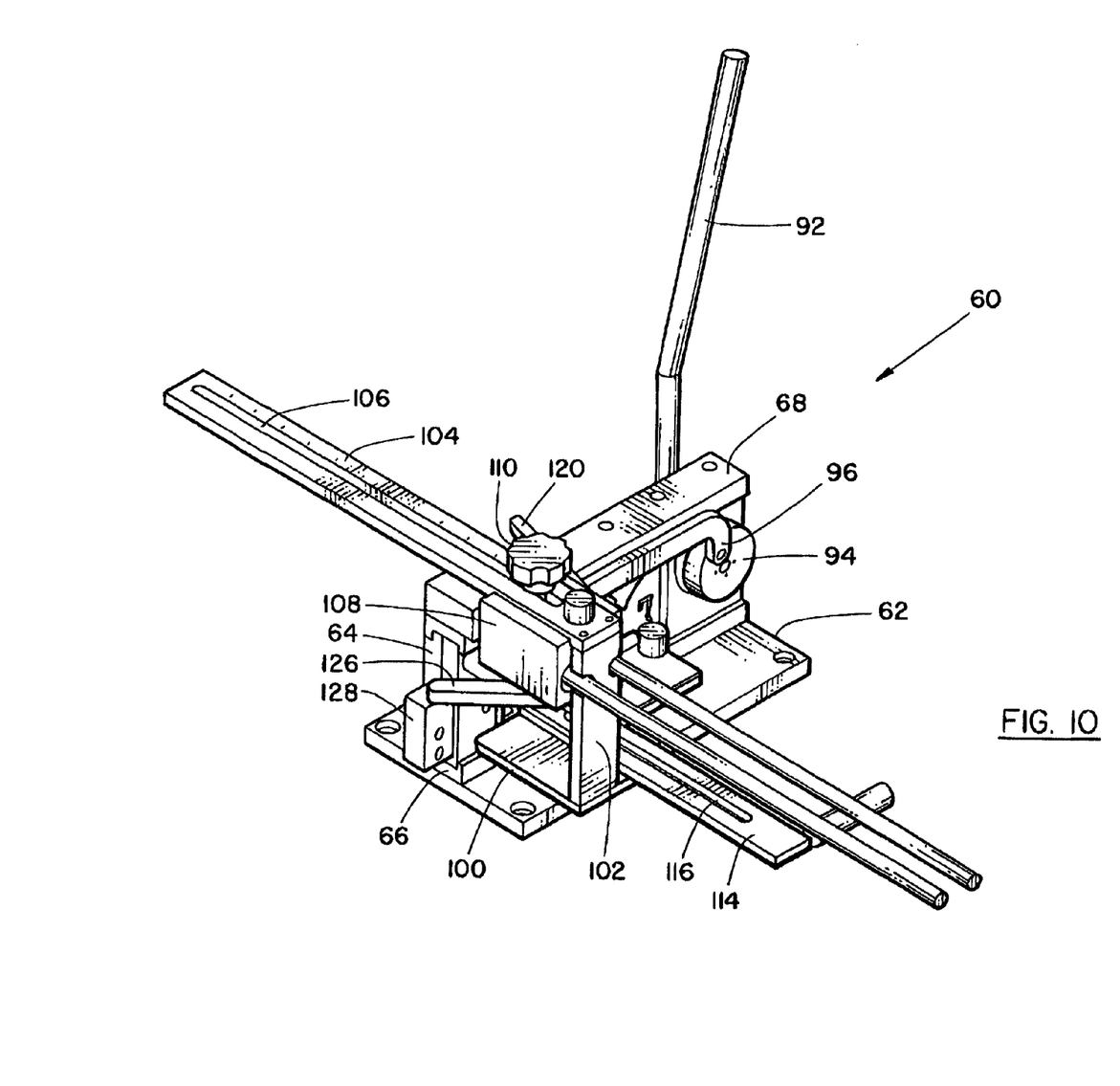
FIG. 10 is a perspective from another angle of the apparatus of FIG. 9.

Referring now to FIGS. 9 and 10, a modified form of vertical blind cut down apparatus is shown having end stops for presetting the lengths of the components to be trimmed. It will be appreciated that since this machine is a multi-purpose machine, designed for trimming carious types of vertical blinds, such end stops will be required to register with the various specific components, and may have to be adjusted to different lengths of trim for different components. Accordingly, the modified machine is indicated generally as 60 and has a base plate 62, which can be secured to a bench, and component holder plate 64 fixed to base 62 at right angles. Component plate 64 is secured in a lower channel 66, which is mounted on base 62, and an upper channel 68 is secured along the upper edge of plate 64. Holder plate 64 has first head rail opening 70 tilted at an angle, and a second head rail opening 72, which is oriented to lie on a vertical axis. A third head rail opening 74 is spaced from second opening 72. The three head rail openings receive head rails of various different types of vertical blinds or window coverings. These vertical blinds or window coverings customarily have various different types of head rails, each having various different dimensions. Holder plate 64 also has a blind slat or covering component recess 76. The recess 76 is of generally rectangular shape and functions to receive the blind slats or covering materials of the blind or window covering. The coverings may be relatively wide strips of thicker materials in some vertical blinds. In this case, the strips may be formed from a metal, plastic, or fabric. Window coverings are also known in which the covering is a continuous sheet of fabric, pleated and folded in concertina fashion at the pleats, so that the entire piece of fabric, if being trimmed, must be trimmed along each edge, over its entire length. Vertical blinds require, for example, that the head rail is trimmed to the required width dimension of the window or doorway, and that the vertical strips are trimmed, by a different amount as required by the height or the window or doorway.

The actual trim cuts are achieved by the cutting die support plate 78 which is slidably supported between lower channel 66 and upper channel 68. Plate 78 has three headrail cutting die openings 80 and 82 and 84 which register with respective head rail openings 70, 72 and 74 in holder plate 64. This enables various different profiles of head rail to be trimmed in the same machine.

A blind slat or covering component cutting plate 86, separate from plate 78, is also slidably mounted in channels 66 and 68. Plate 86 has a cutting opening 88 for cutting the covering components described above. A suitable cutting blade 90 is secured to plate 86 adjacent the opening 88. Both plates 78 and plate 86 are moveable to perform respective cutting strokes.

The two plates 78 and 86 are moveable by handle 92 and an internal drive cam (not shown) similar to the drive cam 42 of the embodiment of FIGS. 3,4,5 and 6, which drives the plate 78. The plate 86 is driven by boss 94, similar to the boss 46 of the embodiments of FIGS. 4, 5 and 6. Boss 94 is connected by connection arm 96 as in the previous embodiment to cutting plate 86.

Figure 4:
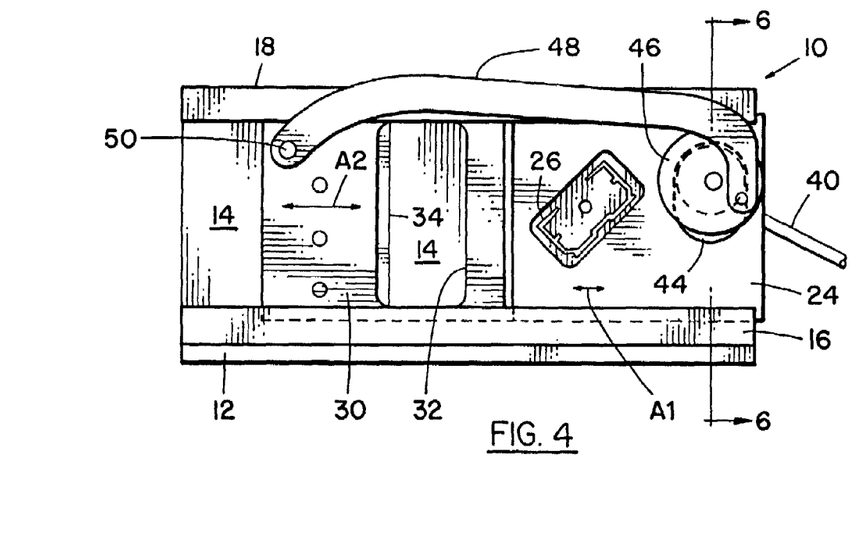
FIG. 4 is a side elevation view showing, in phantom, the length of travel of the head rail cutting die and the blind slat cutter respectively and showing in phantom two positions of the manual transmission.
Figure 5:
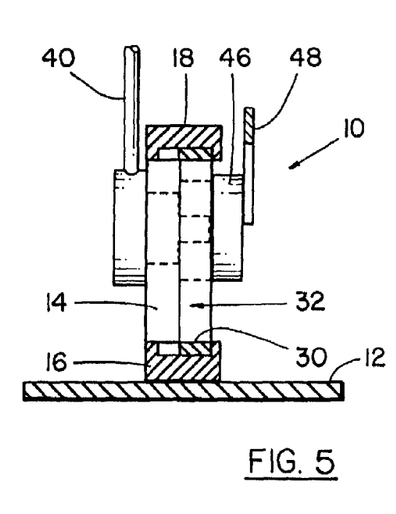
FIG. 5 is a section along the line 5—5 of FIG. 3.

By this means two plates 78 and 86 are moveable simultaneously in response to the single semi rotary movement of the handle 92, but will move along cutting paths which are of different lengths. The cutting path of plate of 78 being relatively short and the cutting path of plate 86 being significantly longer in the same way as shown in FIGS. 3 and 4.

In order to provide for a stop means or end stop for the head rails and blind materials or blind components being cut down, and end stop plate 100 is provided. Plate 100 is mounted on a vertical post 102. Post 102 is mounted on a transverse slide bar 104. Slide bar 104 is provided a lengthwise slot 106.

Slide bar 104 is moveably secured to a slide block 108 being adjustable relative to block 108 by means of locking screw 110 received in slot 106 as shown. Slide block 108 is mounted on parallel guide rods 112, and is slidable therealong in a manner to be described below. Mounted on end stop plate 100 is a blind component stop bar 114 having an elongated slot 116 form therein. A clamping rod 118 is received in slot 116 and may be operated by handle 120, so as to clamp stop bar 114 to plate 100. For certain types of blind components, a hinge portion 122 of plate 100 may be hinged on hinge 124 between an upstanding position (not shown) and the horizontal position as shown in FIGS. 9 and 10. The entire end stop assembly is moveable, in response to cutting movement of handle 92 by means of link 126, (FIG. 10), connected to an end block 128 on component cutting plate 86. This will, through the link 126, move the slide block 108 along guide rods 112, thereby moving the end stops away from the components at the time they are cut.

The purpose of providing the two means of adjustment, namely the slide bar 104 and locking screw 110, and the stop bar 114 and rod 118, is to permit the end stops to be set at different positions, while performing the single cutting operation. This is required because in the case of certain types of window coverings, typically verticals for example, the head rail will be cut down at one end only to fit the width of a door whereas the vertical blind elements or materials will be cut down at their lower ends, to fit the height. The two trim cut will be of different lengths. Similar considerations may arise with all the types of window covering.

The foregoing is a description of a preferred embodiment of the invention which is given here by way of example only. The invention is not to be taken as limited to any of the specific features as described, but comprehends all such variations thereof as come within the scope of the appended claims.

PARTS LIST 10 in line cut down apparatus
12 base plate
14 fixed blind holder plate
16 lower channel
18 upper channel
20 head rail holder opening
22 blind slat holder opening
24 moveable head rail cutting plate
26 head rail cutting opening
30 blind cutting plate
32 blind slat cutting opening
34 cutting knives
38 drive shaft
40 manually operable lever
42 drive pin
44 drive opening
46 boss
48 crank arm
50 Pin
60 Machine
62 Base
64 Plate
66 Lower Channel
68 Upper Channel
70 First int HR
72 Second HR
74 Third HR
76 Component Receiver
78 Cutting die plate
80 HR die
82 HR die
84 HR die
86 Component cutting plate
88 Cutting opening
90 Blade
92 Handle
94 Boss
96 Arm
102 Post
104 Slide Bar
106 Slot
108 Slide Block
110 Locking screw
112 Guide Rods
114 Stop Bar
116 Slot
118 Rod
120 Handle
122 Hinge portion
124 Hinge
126 Link
128 End Block

What is claimed is:

1. A vertical blind cut-down apparatus for trim cutting a vertical blind having a horizontal headrail defining two ends, and vertical blind materials defining upper and lower ends suspended by the upper ends from the headrail, the vertical blind cut down apparatus comprising:

a headrail holding plate having a headrail opening formed therein for receiving the headrail therethrough;

a cutting die adapted to receive the headrail extending therethrough, and being movable relative to said holding plate for cutting one end of the headrail;

a blind holder having a blind material opening therethrough for receiving the vertical blind materials therein;

a blind cutting device movable relative to said blind holder for cutting the vertical blind material extending through said blind holder; and a movement transmission device for moving said cutting die and said blind cutting device, whereby both the vertical blind material and the headrail are cut, wherein said headrail opening in said holding plate is tilted at an angle, and said cutting die defines a cutting opening which is similarly diagonal, said cutting die being slidably movable relative to said holding plate so that the headrail is cut along a linear diagonal direction, and wherein said movement transmission device further comprises a rotary shaft mounted in said holding plate and a cam mounted on said rotary shaft for moving said cutting die a sufficient distance to sever the head rail, wherein said movement transmission device includes a movement transmission link connecting between said rotary shaft and said blind cutting device, for moving said cutting device substantially simultaneously with said cutting die, wherein said rotary shaft carries said cam, said cam being mounted on said rotary shaft, said cam being received in an opening, said opening being formed in said cutting die, said rotary shaft moving said cutting die along a cutting die movement path, and wherein the vertical blind cut down apparatus further comprises a link arm means, said link arm means connected to said rotary shaft and to said blind cutter device, for moving said cutting device through a blind cutting movement path, said blind cutting movement path being longer than said cutter die path.

2. The vertical blind cut down apparatus of claim 1, wherein said cam is located on an axis of said rotary shaft that is offset from a rotary axis of said rotary shaft, wherein said cam has a boss mounted thereon for orbital movement, and wherein said link arm means is connected to said boss.

* * * * *